United States Patent [19]
Thompson

[11] Patent Number: 5,309,594
[45] Date of Patent: May 10, 1994

[54] BUFFING APPLIANCE

[76] Inventor: Timothy E. Thompson, 500 S. Gardner Rd., Burlington, Wash. 98233

[21] Appl. No.: 937,170

[22] Filed: Aug. 31, 1992

[51] Int. Cl.$^5$ ............... B24B 29/00; A46B 13/04
[52] U.S. Cl. ............................ 15/97.1; 15/29
[58] Field of Search ............. 15/23, 24, 28, 29, 97.1

[56] References Cited

U.S. PATENT DOCUMENTS

| | | | |
|---|---|---|---|
| 963,477 | 7/1910 | Service et al. | 15/29 |
| 1,931,893 | 10/1933 | Fleming et al. | 15/29 |
| 1,952,910 | 3/1934 | Decker | 15/29 |
| 2,238,096 | 4/1941 | Baker et al. | 15/97.1 |
| 2,659,915 | 11/1953 | Sears | 15/29 |
| 4,089,079 | 5/1978 | Nicholson | 15/29 |
| 4,383,345 | 5/1983 | Alexander | 15/29 |
| 4,773,120 | 9/1988 | Wang | 15/29 |
| 4,796,321 | 1/1989 | Lee | 15/29 |
| 5,065,463 | 11/1991 | Le | 15/29 |

FOREIGN PATENT DOCUMENTS

| | | | |
|---|---|---|---|
| 766062 | 4/1934 | France | 15/29 |
| 118243 | 4/1959 | U.S.S.R. | 15/29 |
| 1168407 | 10/1969 | United Kingdom | 15/97.1 |

Primary Examiner—Edward L. Roberts
Attorney, Agent, or Firm—S. Michael Bender

[57] ABSTRACT

A new and improved buffing appliance is disclosed comprising a housing, a buffing wheel supported for rotation on the housing, an impeller inside the housing for causing rotation of the buffing wheel, a fluid source coupled to the housing for driving the impeller, a delivery conduit for supplying a surface treating substance (e.g., polishing wax) to the buffing wheel coaxially through the impeller, and separate controls on the housing for controlling rotation of the impeller and delivery of the surface treating compound through the delivery conduit. In an alternative embodiment, the surface treating compound is stored in a liquid form in a canister mounted directly on the housing and including a self-contained pressurizing device for effecting delivery of the compound through the delivery conduit.

2 Claims, 3 Drawing Sheets

BUFFING APPLIANCE

BACKGROUND OF THE INVENTION

1. Field of the Invention

The present invention relates generally to buffing appliances, and more particularly, to a portable buffing appliance especially adapted to effect the treatment of a surface.

2. Description of the Prior Art

Buffing appliances in the form of a motor-driven rotating buffing wheel or pad are well known in the art of cleaning, waxing or polishing various surfaces. For example, U.S. Pat. No. 4,876,760 discloses a typical automatic car washing gantry having mounted thereon a series of motor driven, rotating buffing heads or pads which automatically come into contact with a vehicle surface as the vehicle progresses through the gantry frame. As stated in this patent (column 18, lines 61 et seq.) the machine may be equipped with a spraying device for applying wax or some other surface treatment substance to the surface of the vehicle body, or to the buffer pads, but this reference fails to discloses any means whatsoever to accomplish these functions. In U.S. Pat. No. 4,369,541 there also is disclosed an automatic car washing machine of the gantry frame type wherein a manifold mounted on the frame is adapted to spray wax, soap, or detergent, or combinations of same, at the vehicle utilizing a mixture of air and water under pressure (e.g. foam). Similarly, the automobile washing system disclosed in U.S. Pat. No. 3,537,423 features a separate rotating nozzle through which a whirling spray of wax, soap, etc. may be sprayed onto the side of a vehicle moving past the rotating nozzle.

Thus, while the foregoing body of prior art indicates it to be well known to use buffing and surface treatment substance applying devices in close proximity to each other, the provision of a more simple apparatus combining the buffing and surface treatment substance application in a single integrated device is not contemplated. Nor does the prior art described above teach or suggest a portable device which may be used by individuals in a relatively small work space or cleaning bay apart from a complicated, elaborate gantry frame automatic cleaning apparatus. The foregoing disadvantages are overcome by the unique buffing appliance of the present invention as will be made apparent from the following description thereof. Other advantages of the present invention over the prior art also will be rendered evident.

SUMMARY OF THE INVENTION

To achieve the foregoing and other advantages, the present invention, briefly described, provides a housing, a buffing wheel supported for rotation on the housing, means inside the housing for causing rotation of the buffing wheel, drive means coupled to the housing for powering the buffing wheel rotation means, delivery means for supplying a surface treating substance (e.g. polishing wax) to the buffing wheel, and separate control means on the housing for controlling the wheel rotating means and the delivery of the surface treating substance to the buffing wheel, respectively. In an alternative embodiment, the surface treating compound is stored in liquid form in a canister mounted directly on the housing and includes self-contained pressurizing means for effecting delivery of the solution to the buffing wheel.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least two preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved buffing appliance which has all of the advantages of the prior art and none of the disadvantages.

It is another object of the present invention to provide a new an improved buffing appliance which may be easily and efficiently manufactured and marketed.

It is a further objective of the present invention to provide a new and improved buffing appliance which is of durable and reliable construction.

An even further object of the present invention is to provide a new and improved buffing appliance which is susceptible of a low cost of manufacture with regard to both materials and labor, and which accordingly is then susceptible of low prices of sale to the consuming public, thereby making such buffing appliance economically available to the buying public.

Still yet a further object of the present invention is to provide a new and improved buffing appliance that combines a rotating buffer with manually controllable means for applying a surface treating substance to the buffer during use.

It is still a further object of the present invention is to provide a new and improved buffing appliance having self-contained means for storing a surface treating substance capable of being applied to the surface being buffed.

Still a further object of the present invention is to provide a new and improved buffing appliance including means for applying a surface treating substance in a compact, portable device.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved buffing appliance embodying the principles and concepts of the present invention will be described.

Figure 1:
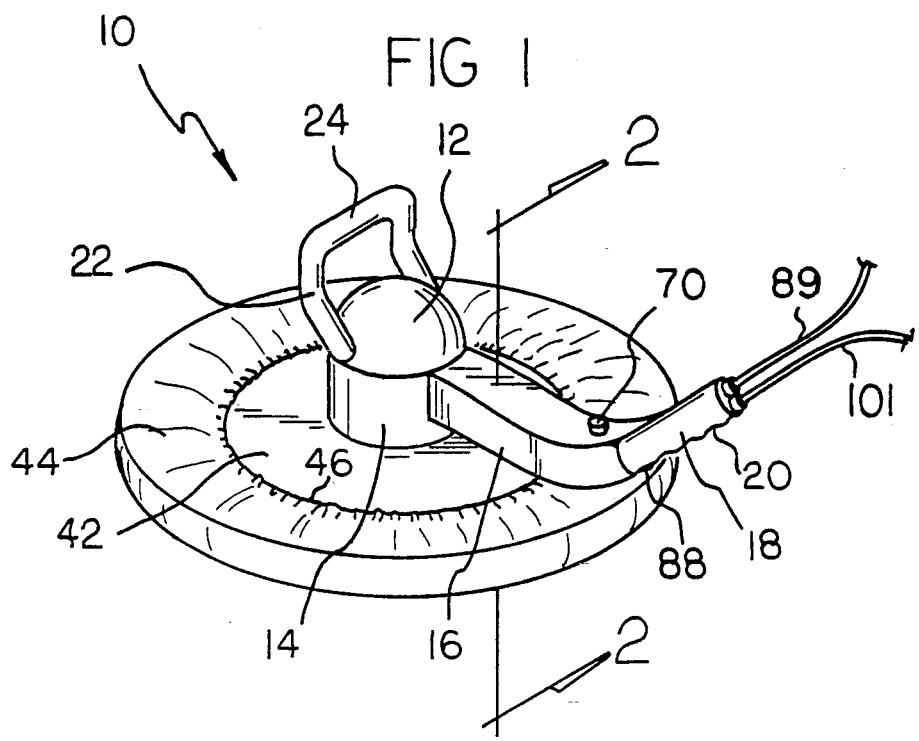
FIG. 1 is a perspective view showing the first preferred embodiment of the buffing appliance of the present invention.
Figure 2:
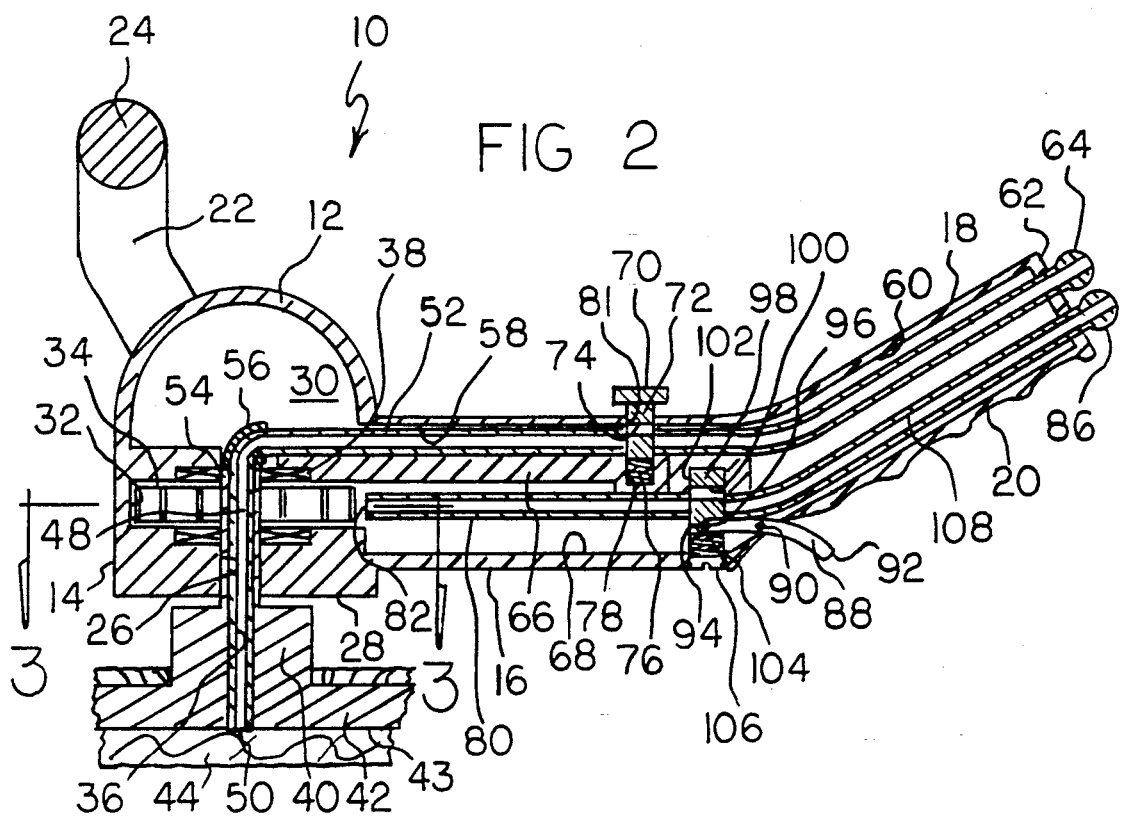
FIG. 2 is a cross-sectional elevational view of the buffing appliance of FIG. 1 taken along line 2—2 of FIG. 1.
Figure 3:
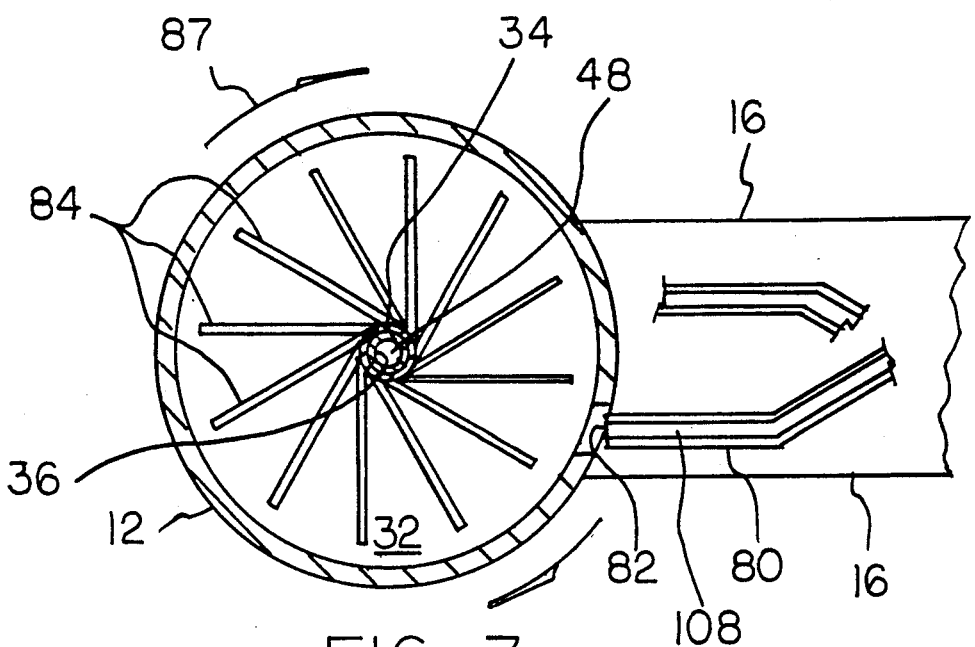
FIG. 3 is a cross-section view of the buffing appliance of FIG. 2 taken along line 3—3 thereof.

Turning initially to FIGS. 1-3, there is shown a first exemplary embodiment of the buffing appliance of the invention generally designated by reference numeral 10. In its preferred form, buffing appliance 10 comprises a generally dome shaped upper housing portion 12 integrated with a generally cylindrically shaped lower housing portion 14. Extending laterally from the lower housing portion is a first handle extension 16 of substantially rectangular cross-sectional shape tapering into and terminating in a generally cylindrically shaped hand grip portion 18. The hand grip portion 18 extends upwardly substantially as shown at an angle of say, thirty degrees, for example, with respect to the longitudinal axis of first handle extension 16, and has a suitably undulating undersurface 20 such that the fingers of the hand may more comfortably grip and hold portion 18.

A second handle extension in the form of a U-shaped bar or grab rail 22 has its extremities suitably attached to opposed sides of the dome-shaped upper housing portion 12 and extends obliquely therefrom before bending upwardly so that its distal portion extends in a plane perpendicular to the plane of first handle extension 16. If desired the undersurface of the cross-bar 24 of the U-shaped second handle extension may be suitably undulated in the same manner as undersurface 20 to provide a more comfortable handle grip for the operator's hand.

By the foregoing arrangement, it will be appreciated that the buffing appliance 10 of the invention may comfortably be held during its intended use by the operator with two hands, one gripping handle grip portion 18 and the other gripping the U-shaped grab rail 22, or more precisely, the cross-bar 24 thereof.

While the housing portions described above may be fabricated of any suitable lightweight durable material, it is preferred that these parts be formed of a suitable polymeric resinous material and molded to the required shape. In this regard, the dome portion 12 and its integral handle bar 22 may be molded in one piece and suitably connected to another molded part of one or more pieces comprising the bottom cylindrical portion 14, the first handle extension 16, and the latter's hand grip portion 18 as will occur to those of ordinary skill in the art.

As shown in FIG. 2, the interior of the buffing appliance is substantially hollow to accommodate the various operating parts thereof. Thus, cylindrical housing portion 14 includes a longitudinal recess 26 extending between the undersurface 28 of the cylindrical portion 14 and the hollow interior hemispherical space 30 defined by dome portion 12 to form a central, axial passage therebetween. Orthogonally intercepting recess or axial passage 26 is a cylindrical space 32 for suitably enclosing a cylindrical impeller or turbine wheel 34 (see FIG. 3). The impeller 34 is fixed to a hollow spindle 36 which, in turn, is mounted for rotation in axial passage 26 and relative to the buffer housing by means of a conventional thrust bearing 38 fixed to housing portion 14 substantially as shown. Impeller 34 and its fixed spindle 36 hence are adapted for rotation about the imaginary central axis defined by recess 26. Spindle 36 extends axially from bottom housing portion 14 and is suitably attached to the hub 40 of buffing wheel 42. The buffing wheel 42, in the preferred embodiment, has its bottom surface 43 covered by a suitable buffing cloth or pad 44 which extends around the peripheral edge of the wheel and extends radially inwardly therefrom to a point where the cloth terminates in a circumferentially extending border 46 intermediate the radial extent of the wheel. Preferably, the buffing cloth 44 has an elastic band sewn into a circumferential pocket adjacent its border to securely maintain the cloth on the buffing wheel 42 yet permit the cloth to be easily and quickly removed and replaced by a new cloth.

In accordance with the invention, the hollow spindle defines a central passage 48 extending longitudinally and axially therethrough which passage terminates in an opening or mouth 50 in the bottom surface 43 of the buffing wheel 42 as best seen in FIG. 2. A supply tube 52, coupled to the opposite extremity or top end 54 of spindle 36 through a suitable swivel coupling 56, extends laterally through the dome shaped upper housing portion, thence longitudinally and axially through handle extension interior space 58, thence through the hollow interior space 60 of handle grip 18 whereupon it exits through the end wall 62 of the hand grip 18 and terminates in a suitable "quick-connect-disconnect" coupling 64 substantially as shown.

A longitudinally extending partition 66 divides the interior of the first handle extension between an upper compartment (interior space 58) and a lower compartment 68 and provides a seat for a push-button valve control comprising a head 70, an integral valve stem 72, a through passage 74 extending perpendicular with respect to the valve stem, and a compression spring 76 for normally maintaining the valve stem in an elevated position. The stem 72 extends through a recess 81 on the top of the second handle extension whereas the spring 76 and the bottom end of the valve stem are suitably seated in a recess 78 in partition 66. By this arrangement, pressure applied to the head 70 of the valve control depresses the valve stem 72 aligning passage 74 with the passage 78 defined by supply tube 52 thereby permitting a liquid surface treating substance from a source connected to coupling 64 to flow through the supply tube 52 and eventually be delivered to the buffing cloth through spindle passage 48 as will be described in more detail below. Preferably, the source provided for the surface treating substance in the embodiment of FIGS. 1–3 comprises a conventional reservoir and pump (not shown) connected to coupling 64 by a supply line or conduit 89.

In the lower compartment 68 below partition 66, an air supply tube 80 is suitably supported. The mouth or open end 82 of the tube is aligned radially with the vanes 84 of the impeller and the tube extends from this position longitudinally and axially through the first handle extension 16, thence at an angle through space 60 of the handle grip portion 18, finally exiting through end wall 62 in a second "quick-connect-disconnect" coupling 86 substantially as shown. A source of compressed air is obtained from a suitable pump or compressor (not shown) and connected to coupling 86 via supply line 101.

The longitudinally extending partition 66 also provides a seat for a second valve control comprising a finger trigger 88 pivotally mounted on a pin 90 supported in space 60 of the hand grip such that the distal end 92 of the trigger extends downwardly at an angle as shown and the opposite end 94 of the trigger is connected via pivot pin 96 to valve stem 98. The valve stem 98, in turn, has a through passage 100 extending perpendicular with respect to the valve stem, and is seated in a complimentary recess 102 in partition 66. A compression spring 104 connected to a set screw 106 threadedly engaging the wall of the handle extension as shown normally maintains the valve stem in an elevated position fully seated within recess 102. By this arrangement, pressure applied upwardly to the trigger 88 causes valve stem 98 to move downwardly against the resilient biasing force of spring 104 which, in turn, causes passage 100 to align with the passage 108 defined by air supply tube 80 thereby permitting air under pressure from a suitable source connected to coupling 86 to flow through the supply tube 80 and impinge against vanes 84 of the impeller 34 thereby causing the impeller to drive the buffing wheel and cloth (i.e. rotate about the axis of spindle 36 in the direction of arrow 87, FIG. 3) as long as the operator holds trigger 88 in the pulled position (and passage 100 remains aligned with air supply tube 80).

In use, an operator connects surface treating substance supply line 89 to coupling 64, connects compressed-air supply line 101 to coupling 86, and securely grips the buffing appliance with one hand on U-shaped grab rail 22 and the other hand on grip handle 18. The operator then uses his forefinger to squeeze trigger 88 thereby causing the buffing wheel and buffing cloth to rotate about the imaginary spindle/housing axis defined by axial passage 26. If and when it is desired to introduce a surface treating substance such as a liquid polishing wax, for example, to the buffing cloth or pad 44, the operator merely depresses valve head 70 with his/her thumb causing the substance to flow through supply tube 52, spindle passage 34, and onto buffing cloth 44 while maintaining the trigger depressed. In this manner, and in accordance with the invention, the substance may be applied to the buffing wheel and cloth at the same time the wheel rotates. Of course, a liquid substance may be allowed to flow through valve 72 without the buffing wheel rotating, that is when trigger 88 is not depressed (i.e. not pulled) inasmuch as the controls for substance supply and for impeller drive are entirely independent with respect to each other. Moreover, it will be noted that because the surface treating substance is supplied through central opening or mouth 50, the centrifugal force of the rotating buffing wheel 42 causes an even distribution or dispersion of the substance through the cloth or pad affixed to the wheel. Finally, it will also be appreciated that owing to the "user friendly" placement of controls 70 and 88 on handle extension 16 and the unique relation of these control elements to handle grip surface 20 and grab rail 22, the operator of the buffing appliance 10 of the invention may manually control the rotation of the buffing wheel and/or the supply of surface treating substance to the buffing wheel/cloth conveniently during use and without taking his hands off the appliance.

Figure 4:
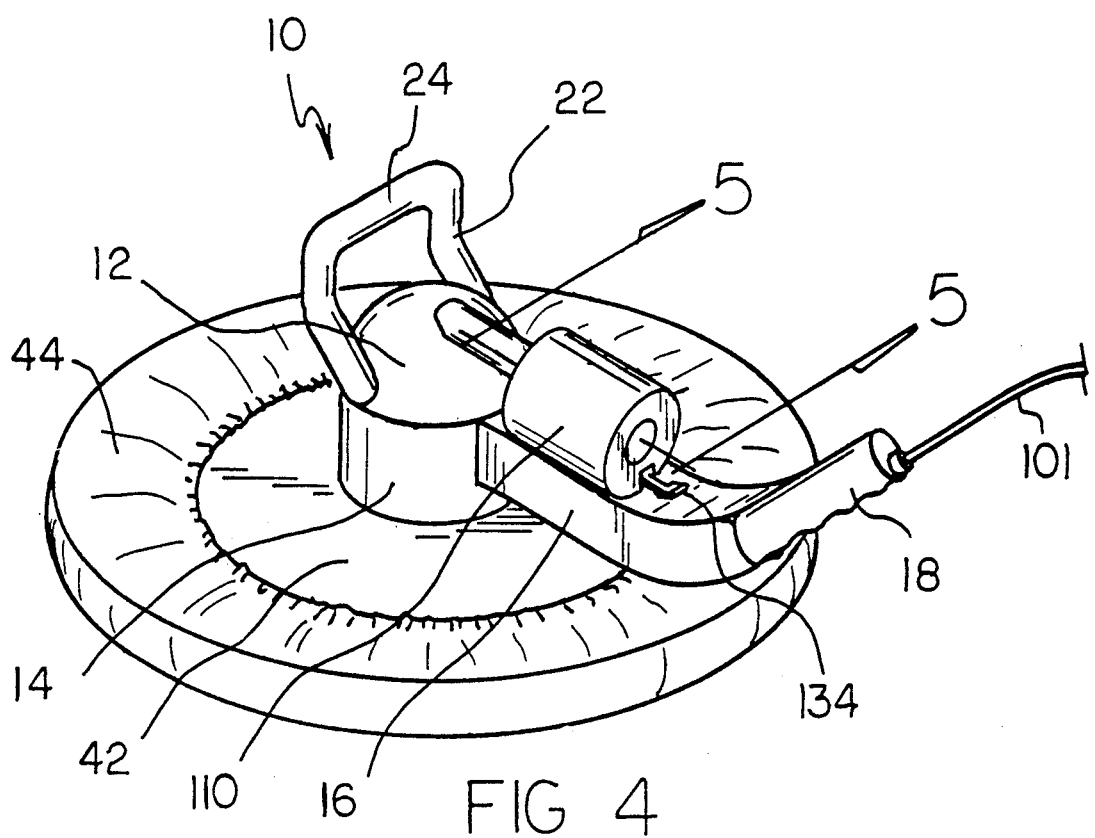
FIG. 4 is a perspective view in elevation of a second preferred embodiment of the invention.
Figure 5:
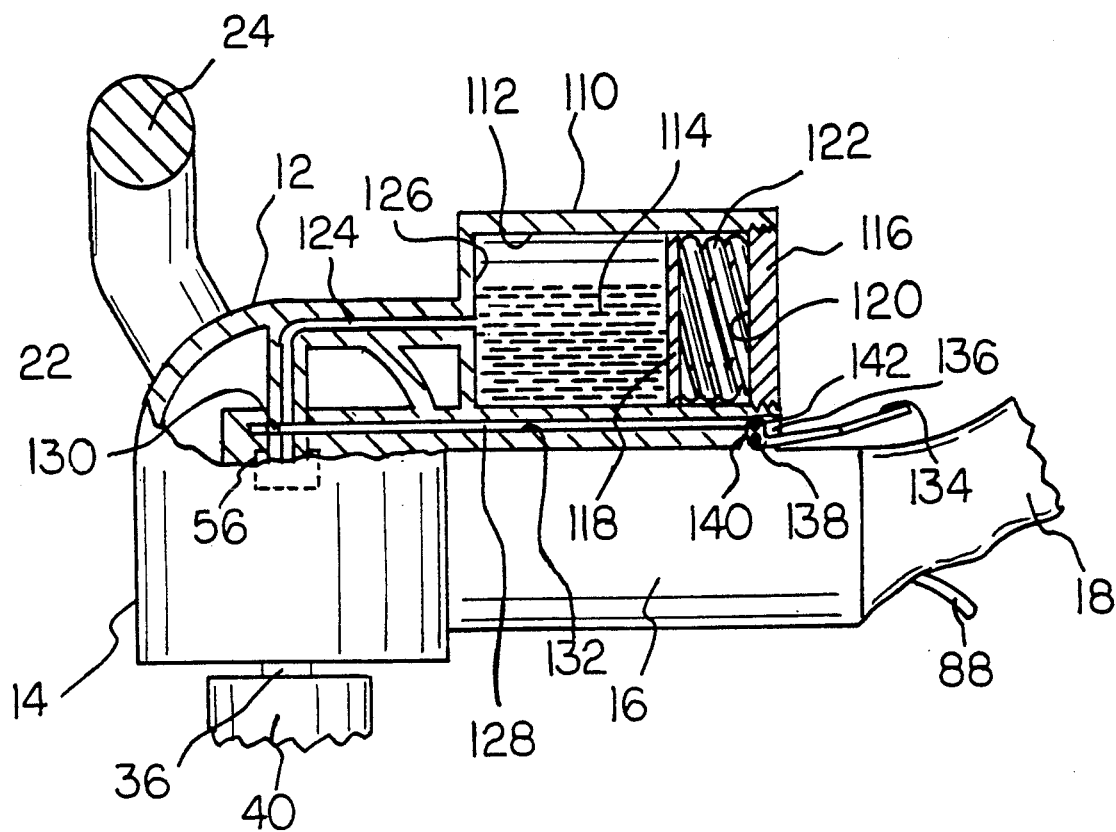
FIG. 5 is a partial cross-sectional view in elevation of the second preferred embodiment of the invention taken along 5—5 of FIG. 4.

Turning now to FIGS. 4 and 5, wherein like reference numerals represent like parts, there is shown an alternatively preferred embodiment of the invention in which the surface treating substance is stored in a cartridge or canister mounted directly on the buffing appliance and is entirely self-contained. Thus, in the alternative exemplary embodiment of FIGS. 4 and 5, the external surface treating substance supply line 89 and its associated coupling 64 are eliminated in favor of a canister generally designated by reference numeral 110 mounted on the upper surface of handle extension 16 and a corresponding modification of internal supply tube 52.

Preferably, canister 110 is cylindrically shaped and molded integrally with both the handle extension 16 and the dome shaped upper housing portion 12 as better viewed in FIG. 5. The canister defines an interior space or chamber 112 in which a liquid surface treating substance 114 such as polishing wax, for example, is stored. The canister is sealed at its right-most end as viewed in FIG. 5 by a cap member 116 adapted to threadedly engage the rim of the canister in a tight sealing manner, yet is easily unscrewed and removable to recharge the interior of the canister with replacement surface treating solution as and when necessary. A diaphragm or piston 118 connected to the inside surface 120 of cap member 116 via spiral compression spring 122 places the contents of the canister under a positive pressure when the cap is sealingly engaged as depicted in FIG. 5. A fluid supply passage 124 is suitably provided extending between the leftmost end wall 126 of the canister and swivel coupling 56 atop spindle passage 34. Orthogonally intercepting supply passage 124 is a slide valve 128 having a passage 130 therethrough. In response to activation of valve control lever 134, the slide valve 128 is adapted to slide to the right as viewed in FIG. 5 in a complimentary slide passage 132 suitably formed in the upper wall of handle extension 16. The lever 134 extends from the bottom rightmost end of canister 110 at a slight upward angle and is pivotally supported on the wall 136 of a suitable recess proximal to the rightmost end of slide valve 128 and its complimentary passage 132 via a pivot pin 138. A crank arm 140 integral with the leftmost end of lever 134 is pivotally connected to the slide valve 128 by means of a pin connection 142.

Hence, the surface treating substance stored inside canister 110 may be caused to flow through passage 124, swivel coupling 56, spindle passage 34 and be delivered to the buffing cloth on buffing wheel by depressing lever 134 inasmuch as such action causes the crank arm 140 to rotate clockwise about an axis defined by pin connection 138 thereby causing the slide valve to move to the right as viewed in FIG. 5 sufficient to align passage 130 therein with the bore of passage 124.

Although canister 110 is shown integrally molded to the dome shaped upper housing 12 and the handle extension 16, it will be appreciated that the canister may be formed separately and connected to supply passage 124 by a suitable known "quick-connect-disconnect" coupling. This will have the advantage of enabling a fresh canister to be merely snapped in place after the old one becomes empty and is discarded.

In use, the alternative embodiment of FIGS. 4 and 5 is employed in the same manner as the prior embodiment of FIGS. 1-3 with the exception that since there is no need to for an external source of surface treating substance, coupling 64 is dispensed with, and control lever 134 is activated in lieu of control valve 72 to control the supply of the surface treating substance to the buffing cloth and buffing wheel.

Finally, it will be appreciated that the term "surface treating substance" as used in the above description and in the appended claims is to be broadly construed to embrace waxes, soaps, detergents, degreasers, solvents and any other compounds, solutions, etc. that may be applied to a surface for the purpose of cleaning, polishing, or treating same, or in any way altering the appearance thereof. Likewise, although the present invention has been particularly described in connection with preferred embodiments comprising a buffing wheel mad buffing cloth mounted thereon, it will be understood that the invention is broad enough to cover the use of other forms of coverings or attachments to the buffing wheel including, but not limited to sand paper, steel wool mats, wire brushes, solid wax discs, impregnated pads and so.

It is apparent from the above that the present invention accomplishes all of the objectives set forth by providing a new and improved buffing appliance that is low in cost, relatively simple in design and operation, and which may advantageously be used in relatively small work spaces by an operator to buff the surface of an article and control the application of a surface treating substance to the surface of the article during its operation, i.e. without taking the operator's hands off the buffer.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved buffing appliance comprising:
a housing,
a buffing wheel,
means in said housing for causing rotation of said buffing wheel about a predetermined axis,
first control means associated with said housing for regulating said rotation means,
surface treating substance supply means in said housing, and
second control means associated with said housing for regulating said supply means,
wherein said housing comprises a first portion for enclosing said rotation means, said predetermined axis extending through said first portion, said housing further comprising first handle means extending from said first portion, and second handle means on said housing first portion,
wherein said substance supply means comprises a delivery tube extending through said housing, said tube having a first portion extending coaxial with respect to said predetermined axis whereby said tube is adapted to deliver said substance in response to said second control means from a substance storage source to said rotating wheel,
said second control means comprises valve means for controlling the flow of said substance through said first portion of said delivery tube,
wherein said substance supply means further comprises an external reservoir for storing said substance, and a supply conduit connected between said reservoir and said delivery tube first portion,
wherein said substance supply means comprises a canister mounted on said first handle means for storing said substance therein and defining said reservoir, said canister having an outlet connected to said supply conduit, and said canister having self-contained means for urging said substance in said canister to flow through said conduit and said first portion of said delivery tube.

2. The invention of claim 1 wherein said means for urging comprises a diaphragm in said canister, said canister having an end cap for removably sealing the end of said canister opposite said outlet, said diaphragm being connected to said end cap inside said canister by resilient biasing means urging said diaphragm toward said outlet.

* * * * *